May 31, 1966  R. D. RULSEH ETAL  3,254,166
APPLIANCE TIMER
Filed Dec. 23, 1963  2 Sheets-Sheet 1
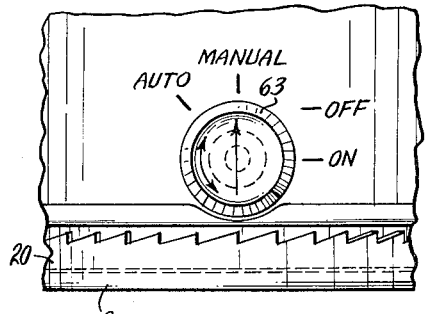
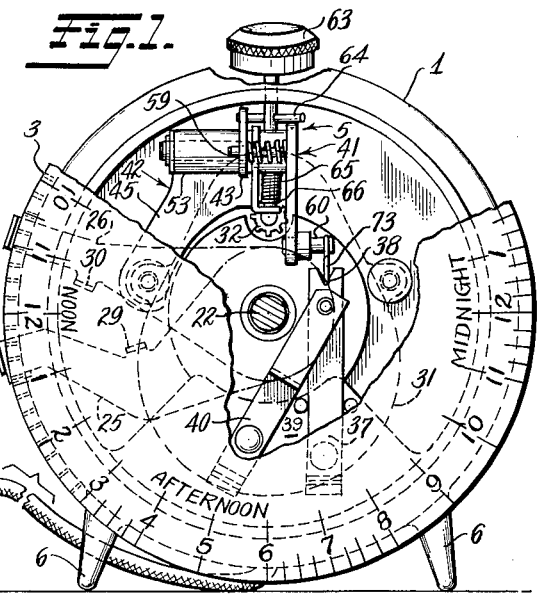
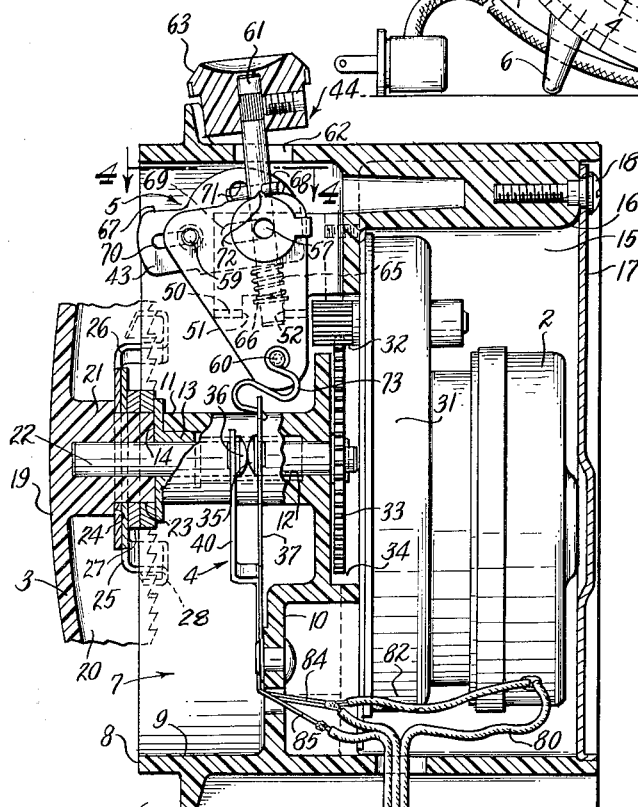
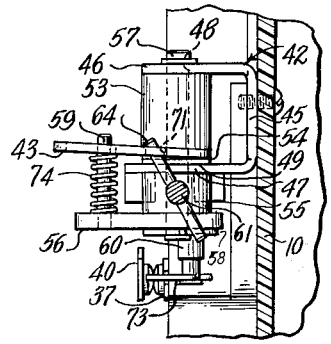
INVENTORS
William H. Pierson
Roger D. Rulseh
BY Stewart F. Moore
ATTORNEY INVENTOR
William H. Pierson
Roger D. Rulseh
BY
ATTORNEY

3,254,166
APPLIANCE TIMER
Roger D. Rulseh, Two Rivers, and William H. Pierson, Manitowoc, Wis., assignors to American Machine & Foundry Company, a corporation of New Jersey
Filed Dec. 23, 1963, Ser. No. 332,739
10 Claims. (Cl. 200—38)

This invention relates generally to a time controlled switch, and more particularly to a time controlled switch having an improved operating mechanism to provide for automatic and manual operation.

The switch of this invention is particularly adapted to control the operation of appliances commonly found in the home, for example television receivers, radios, electric coffee pots, and other similar appliances which it is desirable to control both manually and automatically. To control an appliance with this time switch the appliance is plugged into a receptacle associated with the switch whereupon the time switch serves as a control station for the appliance. Hence the appliance need only be turned on and plugged into the time switch after which the appliance is controlled solely with the time switch. In the past, there have been several attempts to provide a time switch with the capabilities of the time switch of this invention. Most of such prior devices have either been too complicated for the user to operate or have been too expensive to manufacture in view of the present competitive market.

In accordance with this invention, the time switch is set for either manual or automatic operation by manually rotating a control member, for example, a control knob. To turn manually off or on the appliance connected to the time switch, the control knob is manually manipulated in a toggle switch fashion. Hence, both the off and on operation of the appliance as well as the setting for automatic or manual operation are controlled by a single, manually operated, control knob.

The control knob is connected to a pivotally mounted switch actuator. The actuator is pivotally moveable to a first position in which the switch is on, and a second position in which the switch is off. Manipulation of the control knob to pivot the actuator turns the switch on or off manually. A trip arm carried by the actuator is effective to pivot the actuator to operate the switch automatically when the trip arm is engaged by an "on" trip lug or an "off" trip lug driven by a timer motor. The control knob is connected to the actuator in such a manner that rotation of the knob extends and retracts the trip arm. In its extended position the trip arm is disposed with an end in the path of travel of one of the trip lugs and the switch is operated automatically. In its retracted position the trip arm is disposed out of the path of travel of the trip lugs and the switch is wholly manually operable. When the trip arm is in its extended position the control knob can be moved manually to control the appliance connected to the switch. The trip lugs are time controlled and are adjustable to preset the time at which each engages the trip arm to operate the switch from one condition to the other. Hence, if it is desired to automatically control the operation of an appliance plugged into the timer it is merely necessary to manipulate the knob to move the trip arm into its extended position whereupon the appliance will be turned off or on at a preselected time. On the other hand if it is desired that the appliance be manually controlled it is merely necessary to manipulate the control knob so that the trip arm is retracted whereupon the trip lugs pass beyond the end of the trip arm and have no effect on the arm or the switch.

With an appliance properly connected the operations which can be controlled at the time switch are:

(1) *Continuous on.*—The control knob is moved to a position to turn the appliance on, and the trip arm is retracted to prevent automatic operation. Hence, the appliance remains on until the control knob is manually operated.

(2) *Continuous off.*—The control knob is moved to its other position to turn the appliance off, and the trip arm is left in its retracted position. Hence, the appliance remains off until the control knob is manually operated.

(3) *Automatic on.*—The control knob is positioned so that the appliance is off. The trip arm is extended, and the on trip lug is set to engage the trip arm at a certain time to automatically turn the appliance on at that time.

(4) *Automatic off.*—The control knob is positioned so that the appliance is on. The trip arm is extended, and the "off" trip lug is set to engage the trip arm at a certain time to automatically turn the appliance off at that time.

(5) *Controlled interval on.*—Control knob is moved to position where appliance is off. Trip arm is extended. "On" trip lug is set to turn the appliance on at a certain time. "Off" trip lug is set to turn the appliance off at a certain later time. Hence, the appliance is automatically turned on at a selected time, and remains on for a controlled interval of time, and is then automatically turned off.

(6) *Controlled interval off.*—Control knob is moved to position where appliance is on. Trip arm is extended. "Off" trip lug is set to turn the appliance off at a certain time. "On" trip lug is set to turn the appliance on at a certain later time. Hence, the appliance is automatically turned off for a controlled interval of time, and is then automatically turned on.

A particularly advantageous feature of this time switch and control knob arrangement is that the switch can always be operated manually to override the automatic control. Hence, should the controlled appliance be turned off automatically when the user wants it on, it is merely necessary to rotate the control knob to retract the trip arm, whereupon the knob can be moved to turn the appliance on immediately regardless of the position of the trip lugs. When it is again desired to resume automatic control of the appliance it is merely necessary to rotate the control knob to extend the trip arm.

A further advantage over known prior art time switches is that the trip arm can be retracted or extended by rotating the control knob manually when the switch contacts are open, and when the contacts are closed without operating the switch. Hence, there is no need to operate the switch merely to change from automatic operation to manual operation, or vice versa, as is necessary with at least one prior art device. Such direct operation of the trip arm is a substantial advantage since the operating life of many electrical devices such as light bulbs and radio tubes is shortened by excessive on and off operation.

Thus, an object of this invention is to provide an improved time switch with a unique operating mechanism for automatic and manual control of the time switch.

Another object is to provide an improved time switch with an operating mechanism that includes a manually rotatable control member to set the time switch for automatic and manual operation.

A further object is to provide a time switch operating mechanism that is compact, simple to operate, and inexpensive to manufacture.

A further object is to provide a time switch operating mechanism which can be set for automatic and manual operation without operating the electrical contacts of the switch.

A still further object is to provide a time switch for automatic and manual operation in which the operating mechanism can be controlled manually to override the automatic operation at any time.

The following specification, of which the accompanying drawings form a part, explains the manner in which the foregoing objects are attained in accordance with this invention. In the drawings:

FIG. 1 is a front elevational view of the time switch with portions of the dial cut away to show the several elements of the switch operating mechanism;

FIG. 2 is an enlarged sectional view in side elevation of the time switch of FIG. 1;

FIG. 3 is an enlarged partial plan view of FIG. 1 showing the operating knob and its control position indicia;

FIG. 4 is an enlarged view of the switch actuator looking along lines 4—4 of FIG. 2;

FIGS. 5 through 8 are partial side elevational views of the time switch of FIG. 2, the several operating elements being shown in their various operating positions with:

Figure 5:
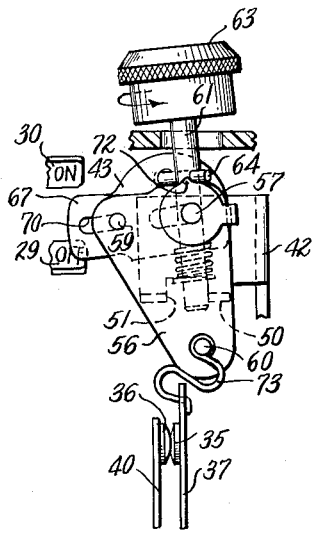
Figure 6:
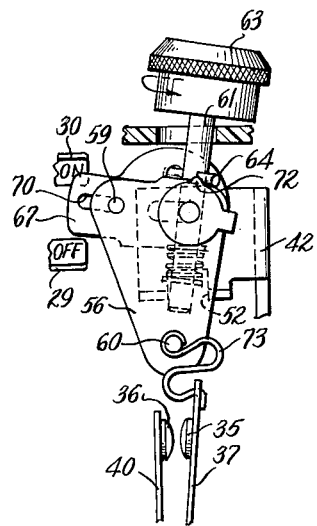
Figure 7:
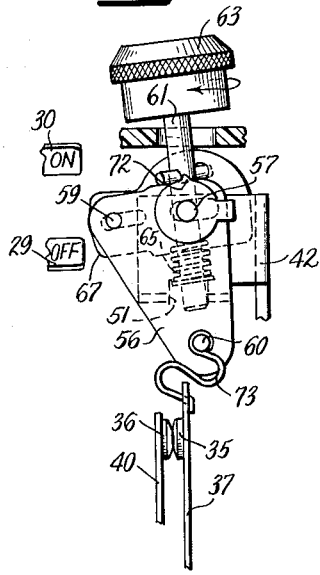

FIG. 5 showing the operating mechanism set for automatic off operation;

FIG. 6 showing the operating mechanism set for automatic on operation;

FIG. 7 showing the operating mechanism set for continuous on operation; and

Figure 8:
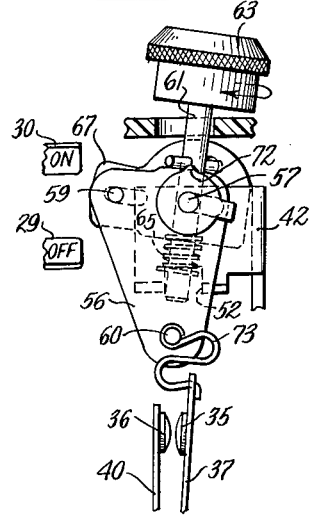

FIG. 8 showing the operating mechanism set for continuous off operation.

Referring now to the drawings in detail and particularly to FIGS. 1 and 2, the time switch of this invention is seen to include a housing 1, a motor 2, a dial 3, an electrical switch 4, and a switch operating mechanism 5.

Housing 1 is formed of molded plastic material, the housing being generally circular in section as viewed in front elevation and having a length sufficient to accommodate the various elements of the time switch. The housing has a pair of supporting legs 6 to stably support the housing on a flat surface. A front chamber 7 has a flat annular front end 8, the chamber being defined by circular side wall 9 of the housing and a transverse stepped partition 10 integral with the side wall. The partition is generally perpendicular to the side wall and is parallel with and spaced from front end 8. Integral with partition 10 is a bushing 11 that projects towards front end 8 of the housing. Bushing 11 has a central bore 12 with an axis that is aligned with the axis of circular side wall 9. The unattached end of bushing 11 has a flanged sleeve 13 with a transverse flat annular surface 14.

On the opposite side of partition 10 is a rear chamber 15 having an end 16 provided with a removable cover 17 that is conveniently secured by threaded fasteners 18.

Dial 3, which is circular, is formed from plastic material and has a gently curved exposed face 19 and a short cylindrical wall 20 that projects in a direction away from exposed face 19. At its center dial 3 has an integral hub 21 having a bore in which an end of a shaft 22 is fixed. Shaft 22 is elongated to extend through bore 12 of bushing 11 so that the other end of the shaft projects slightly beyond the partition 10. Hub 21 has a reduced diameter cylindrical portion 23 that terminates at flat annular shoulder 24. A pair of trippers 25 and 26 are mounted on the hub for movement circumferentially of the dial. Each tripper is stamped from springy sheet material and is in the form of a flat arm having an enlarged end that has a circular opening sufficient to permit rotation on the cylindrical portion of the hub. The trippers are retained on cylindrical portion 23 between shoulder 24 and a collar 27 secured to the hub after the trippers are mounted. As best seen in FIGS. 1 and 2 trippers 25 and 26 extend radially of the dial in adjacent parallel planes that are parallel with dial 3.

Each tripper has a generally U-shaped end 28 which extends around the terminal edge of cylindrical wall 20. The terminal edge of wall 20 is provided with ratchet teeth that coact with lugs at the base of the U-shaped ends 28 to positively drive the trippers in a clockwise direction when the dial is driven. The free leg of each of the U-shaped ends 28 is provided with a pointer to set the trippers at proper positions relative to the dial for operating the switch at preselected times. Tripper 25 is formed with a trip lug 29 and tripper 26 is formed with a trip lug 30, each trip lug projecting perpendicularly away from dial 3 toward switch operating mechanism 5. Trip lug 29 is closer to the center of dial 3 than trip lug 30 so that the circular paths traversed by the trip lugs when the dial is driven are concentric and the circular path of trip lug 29 is inside the circular path of trip lug 30. In the embodiment illustrated, trip lug 29 operates to automatically move the switch operating mechanism 5 to a position in which the contacts of switch 4 are open, whereas trip lug 30 operates to automatically move the operating mechanism to its other position in which the contacts of switch 4 are closed.

Motor 2 is a self-starting alternating current synchronous motor of the type normally used in timing devices. The motor assembly includes a self-contained reduction gear unit 31 which drives a pinion gear 32. Pinion gear 32 drives spur gear 33 which is coupled to shaft 22 by a conventional helical spring one way clutch (not shown) which permits manual rotation of the dial in a clockwise direction only to set the dial to correspond with the time of day.

Dial 3 is driven at the rate of one revolution a day by a motor 2 via gears 32 and 33. The exposed face 19 of the dial is provided with suitable indicia to indicate each of the twenty-four hours of the day, so that the dial and trippers can be properly set for operation of the switch at a desired time.

Motor 2 is disposed in rear chamber 15 of the housing and is secured to partition 10 with threaded fasteners (not shown). Pinion gear 32, which is driven by the motor via a self-contained reduction gear unit 31, projects from the gear a unit into a cylindrical recess 34 in that portion of the partition 14 that faces toward motor 2 so that pinion gear 32 meshes with spur gear 33, which is also in the recess.

As best seen in FIG. 2 switch 5 includes a movable contact 35 and a stationary contact 36. Movable contact 35 is secured to an electrically conductive flat spring contact arm 37 at a position slightly spaced from an end of the arm that has a V-shaped notch 38. The end of contact arm 37 opposite contact 35 is fixed to a flat surface 39 of a wall of the housing, the surface 39 being in a plane parallel with and spaced between the front end 8 and partition 10. Movable contact arm 37 is mounted on surface 39 so that the arm extends in a generally vertical direction from the lower part of the housing and terminates at approximately the centerline of the housing. Stationary contact 36 is fixed adjacent the end of a rigid contact arm 40 formed from sheet metal having good electrically conducting properties. Arm 40 which is step shaped in side elevation is mounted on surface 39 in such a manner that movable contact 35 is aligned with stationary contact 36. To affect such alignment contact arm 40 is inclined toward contact arm 37 so that the arms overlap in spaced apart relation at the contacts. The contact supporting ends of arm 37 and arm 40 are in spaced apart parallel planes perpendicular to the axis of shaft 22.

As shown in FIGS. 1, 2 and 4 switch operating mechanism 5 comprises a switch actuator 41, a mounting bracket 42 for pivotally mounting the switch actuator, a trip arm 43 carried by the actuator and a control member 44 also carried by the actuator.

Mounting bracket 42 is formed from stiff sheet metal and has a flat elongated base 45 secured to partition 10 and a pair of legs 46 and 47 that project perpendicularly from base 45 so that the legs extend generally parallel with the axis of shaft 22. Hence, as viewed in FIG. 4, mounting bracket 42 is generally U-shaped. Legs 46 and 47 have a pair of aligned bores 48 and 49 which function as bearings for mounting the actuator for pivotal movement. Projecting from a side edge of leg 47 in a direction away from leg 46 are a pair of spaced apart tabs 50 having edges 51 and 52 which act as stop surfaces to limit the pivotal movement of actuator 41.

Switch actuator 41 includes a bushing 53, a spacing washer 54, a sleeve 55, an actuating arm 56 of electrically insulating material, and a shaft 57 for mounting the various elements of the actuator for pivotal movement on bracket 42. Shaft 57 has a diameter that is slightly less than bores 48 and 49 so that shaft can be slipped through the bores. Bushing 53 and washer 54 have bores of similar diameter and are disposed on each side of trip arm 43 on that portion of shaft 57 that extends between legs 46 and 47. The end of shaft 57 adjacent leg 46 is mechanically deformed to prevent the end from passing through bore 48. At its other end the shaft is elongated to project beyond leg 47. Sleeve 55, actuating arm 56, and a retaining washer 58 are slipped over the projecting end of shaft 57 which is then mechanically deformed to secure the various elements to the shaft.

Actuating arm 56 has an outline configuration similar to a 30°–60° right triangle. Adjacent the right angle corner is an opening for mounting the actuator on shaft 57. Adjacent the 60° angle corner is a pin 59 that projects toward trip arm 43 along an axis substantially parallel with the axis of shaft 57 and, adjacent the 30° corner is a stud 60 that projects in the opposite direction along an axis substantially parallel to the axis of shaft 57. Control member 44 is in the form of an elongated circular shaft 61 that extends through a hole bored through sleeve 55 and shaft 57 so that the shaft 61 has its axis perpendicular to the axis of shaft 57. At the end which passes through slot 62 of the housing, shaft 61 has a control knob 63 which facilitates manual manipulation of the shaft. A pin 64 passes through shaft 61 at right angles to the shaft at a point approximately midway between the ends of the shaft. At the end of shaft 61 opposite control knob 63 is a compression spring 65 that is slipped over the end of the shaft and secured by a retainer 66. The effect of spring 65 is to bias shaft 61 axially so that pin 64 normally engages the short end edge of actuating arm 56.

Trip arm 43 is stamped from flat sheet material and is elongated in a direction generally parallel with the axis of driving shaft 22 to provide a generally rectangular tip 67. One side of trip arm 43 is enlarged as at 68 and has a curved outline configuration. Trip arm 43 has a pair of elongated slots 69 and 70 that extend in aligned relation longitudinally of the trip arm. Slot 69 is open at one end and the trip arm is so disposed on the actuator that the side edges of the slot are on opposite sides of shaft 57. Slot 70 is closed at both ends so that the end edges of the slot act as stop surfaces to limit the movement of the trip arm in its extended and retracted positions when the trip arm is mounted on the actuator as shown in FIG. 4 with pin 59 extending through slot 70. The enlarged rounded portion of trip arm is provided with an aperture 71 into which an end of pin 64 extends. The other end of pin 64 engages the edge of actuating arm 56 on one side or the other of a rounded projection 72 of retaining washer 58.

An S-shaped spring 73 connects the stud 60 to movable contact arm 37. One end of the spring engages with a groove on stud 60 whereas the other end of the spring fits in the bottom of the V-shaped notch 38 of the contact arm. Movable contact arm 37 and the axis of shaft 57 are so situated one to the other that the axis of shaft 57 lies approximately in the plane of movable contact arm 37. The arrangement is such that when control member 44 is manipulated actuator 41 pivots about shaft 57 and stud 60 passes from one side of the plane of contact arm 37 to the other side of the plane of contact arm 37. This provides a snap over center type switch arrangement. When stud 60 is to the right of contact arm 37 as shown in FIGS. 2 and 5, the force transmitted via spring 73 moves contact arm 37 to the left to close the contacts. When actuator 41 is pivoted to its other position stud 60 is to the left of contact arm 37 and the force transmitted by spring 73 causes contact arm 37 to move to the right, to open the contacts. Shaft 61 projects between tabs 50 so that the end of the shaft engages stop surface 52 to limit the pivotal movement of the actuator when the actuator is moved to close the contacts, and engages stop face 51 to limit the pivotal movement of the actuator when the actuator is moved to open the contacts.

In addition to transmitting a force which opens and closes the contacts, spring 73 also transmits an equal and opposite force which maintains actuator 41 in the position to which it is moved to operate the contacts. Hence, no additional mechanism is required to maintain the actuator in either of its positions.

With the operating mechanism assembled as shown in FIGS. 1, 2 and 4 actuator 41 can be pivoted manually by manipulating knob 63 and can also be pivoted automatically by engagement of trip lugs 29 and 30 with trip arm 43, but only when the trip arm is in its extended position. Such pivotal movement of the actuator operates the contacts to an "on" position (FIG. 5) and to an "off" position (FIG. 6).

Since trip arm 43 is connected to the actuator by pin 59 that passes through slot 70, and by shaft 57 in slot 69, a force exerted on either side edge of rectangular tip 67 of the trip arm is transmitted to the actuator to pivot the actuator about shaft 57 from one of its positions to the other, to operate the contacts. Trip arm 43 can also slide radially of shaft 57 along the centerlines of slots 69 and 70. The rounded end edges of slot 70 function as stops to limit the sliding movement of the trip arm. Hence, when the trip arm is extended as shown in FIG. 5, pin 59 engages one end of slot 70 to prevent further displacement of the trip arm away from shaft 57, and when the trip arm is retracted as shown in FIG. 7, pin 59 engages the other end of slot 70 to limit displacement of the trip arm toward shaft 57.

Rotation of control member 44, by manually turning knob 63 is effective to extend or to retract trip arm 43. As shown in FIG. 4, shaft 61 of control member 44 is connected to pin 64, one end of which passes through aperture 71 of the trip arm. Rotation of shaft 61 in a clockwise direction by manually turning knob 63 slides the trip arm to its retracted position and rotation of shaft 61 in the opposite direction slides the trip arm to its extended position. The rotational motion of shaft 61 is changed to reciprocating motion of trip arm 43 by the engagement of pin 64 with the sides of aperture 71. Aperture 71 is somewhat larger than the end of pin 64 that passes through the aperture. The clearance provided by so dimensioning the aperture is necessary to permit shaft 61 to move axially as the end of pin 64 passes over rounded projection 72 when the shaft is rotated.

Rounded projection 72, toward which pin 64 is biased by the action of spring 65, functions to maintain trip arm 43 in its extended or retracted position to which it is moved manually. Considering the movement of shaft 61 when the shaft is rotated, it is apparent that the edge of projection 72, on which pin 64 rides, is effective to displace the shaft axially against the action of spring 65. When the pin is on either side of projection 72, spring 65 exerts sufficient bias to prevent accidental movement of shaft 61, and hence, the trip arm is retained in either its extended or retracted position until the shaft is again rotated by turning knob 63. By virtue of the engagement of pin 59 with the end edges of slot 70, shaft 61 can never be rotated so far in either direction to allow pin 64 to move beyond projections 72.

As previously described trip lugs 29 and 30 are driven by dial 3 in concentric circular paths about the axis of shaft 22. As seen in FIG. 1 on trip lug 30 is further from shaft 22 than off trip lug 29. As shown in FIG. 5, rectangular tip 67 of trip arm 43 is so dimensioned that only off trip lug 29 can engage trip arm 43 when the trip arm is extended and actuator 41 is in its switch "on" position. Correspondingly, as shown in FIG. 6, only "on" trip lug 30 can engage trip arm 43 when the actuator is in its switch "off" position. The action of the trip lugs is to pivot the switch actuator from one of its positions to the other to automatically operate the switch, but only when the trip arm is extended by rotating shaft 61 in the proper direction. When the trip arm is retracted as shown in FIGS. 7 and 8 the trip arm is out of the path of travel of trip lugs 29 and 30 and the switch is set for manual operation.

As shown in FIG. 4, a helically wound compression spring 74 on pin 59 between actuating arm 56 and trip arm 43 normally biases trip arm 43 in a direction opposite to the direction of travel of trip lugs 29 and 30. Spring 74 allows tip 67 of trip arm 43 to move toward actuating arm 56 when the trip arm is engaged by one of the trip lugs. Each trip lug is bent at a slight angle to the plane of the trip arm to urge the trip arm toward the path of travel of the other trip lug. When a trip lug engages the trip arm, the trip arm does not pivot immediately because of the very slow speed of travel of the trip lug. First, the tip of trip arm 43 is moved against the action of compression spring 74. The resisting force of the spring gradually increases as the spring is compressed. Eventually the force from the trip lug becomes great enough to cause the trip arm to slide away from the trip lug to pivot the actuator. The energy stored in the compressed spring then forces the tip of the trip arm toward the trip lug very rapidly so that initial sliding of the trip arm relative to the trip lug is accelerated, and the actuator is pivoted with a snap action to its other position. In addition to assuring snap action of the actuator, compression spring 74 moves tip 67 of the trip arm back to its original position where the trip arm is clear of the trip lug and the actuator can then be pivoted manually to immediately move the actuator back to its other position without first rotating knob 63 to retract the trip arm. Hence, if the switch operates automatically when the user does not want it to operate, he can immediately return the switch to its original condition without delay, and without changing the setting from automatic to manual operation.

FIG. 2 shows the wiring management for motor 2 and electrical switch 4. A plug-socket combination 75 has prongs 76 and 77 which can be plugged into a standard household socket. At its other end plug-socket 75 has terminals 78 and 79 which provide a socket into which the controlled appliance is plugged. Line 80 connects motor 2 to prong 76 to connect one side of the household power supply to the motor. Power from the other side of the power supply is transmitted to the motor via prong 77, line 81, and line 82 so that motor 2 runs continuously when prongs 76 and 77 are plugged into a power supply socket. Terminal 78 is connected directly to prong 76. Terminal 79 is connected to prong 77 via line 83, switch 4, and line 81. Since line 81 is connected to a terminal 84 of stationary contact arm 40, and line 83 is connected to a terminal 85 of movable contact arm 37, power is supplied to terminal 79 only when the switch contacts are closed. Hence, an appliance plugged into the socket at terminals 78 and 79 is on when the contacts of switch 4 are closed, and off when the contacts are open.

Thus, applicants have provided a unique time switch for manual and automatic operation. The various elements of the time switch are so arranged that the axis about which actuator 41 pivots lies in a plane perpendicular to the axis of driving shaft 22. The axis of shaft 61 of control member 44 intersects the axis of driving shaft 22, and the pivotal movement of the trip arm 43 is in a plane parallel to the plane defined by these axes. Shaft 61 is perpendicular to shaft 57, and the extending and retracting movement of trip arm 43 is perpendicular to the plane defined by the intersection of the axes of these shafts. In its retracted position the tip of trip arm 43 is beyond the paths of travel of each of the trip lugs. However, in its extended position the tip of the trip arm is directly in the path of travel of one of the trip lugs.

In the embodiment shown in the drawings, driving shaft 22 extends horizontally at the longitudinal axis of the housing. Dial 3 drives trip lugs 29 and 30 in vertical paths to move trip arm 43 in a vertical plane about shaft 57, which has its axis disposed horizontally and extends transversely of the housing at a location spaced from the paths of travel of the trip lugs.

Because of the indicia which indicates the condition of the time switch to the user, as shown in FIG. 3, the user can tell at a glance exactly how the switch is set, and can accurately change the setting when necessary.

*Operation*

The appliance to be controlled is plugged into the socket portion of plug-socket 75, and prongs 76 and 77 of the plug socket are plugged into a suitable household electrical outlet. Motor 2 then runs continuously and the appliance is turned off and on at the time switch. With the motor energized, dial 3 is driven at the rate of one revolution in twenty-four hours via pinion 32 spur gear 33 and shaft 22. As previously mentioned the connection between shaft 22 and spur gear 33 includes a one way driving clutch (not shown) that permit the dial to be rotated manually in a clockwise direction only to set the dial to correspond with the time of day.

To set the time switch for automatic operation knob 63 is rotated in a counterclockwise direction to move trip arm 43 to its extended position in which tip 67 of the trip arm is in the path of travel of one of the trip lugs, depending on the pivotal position of the actuator. The trip lugs are then adjusted by moving the U-shaped end of appropriate tripper away from the ratchet teeth of the dial whereupon the tripper can be moved circumferentially of the dial to set its trip lug to operate the switch at the desired time by engaging the extended trip arm.

As previously described the operations which can be controlled at the time switch are: (1) continuous on, (2) continuous off, (3) automatic on, (4) automatic off, (5) controlled interval on, (6) controlled interval off.

FIG. 7 shows the position of the operating elements of the time switch when the switch is set for "continuous on" operation. In this position trip arm 43 is retracted and actuator 41 is moved to that position in which contacts 35 and 36 are in engagement so that the appliance is on. With the various elements in the position of FIG. 7 the appliance remains on for an indefinite period of time.

FIG. 8 shows the position of the operating elements of the switch when the switch is set for "continuous off" operation. Trip arm 43 is retracted and actuator 41 is in that position in which the contacts are open so the appliance is off. In this position the path of travel of both the on and off trip lugs is beyond the tip of trip arm 43 and hence, the appliance remains off for an indefinite period of time.

FIG. 6 shows the position of the operating elements of the time switch when the switch is set for "automatic on" operation. Actuator 41 is moved to the position in which the contacts 35, 36 are open so the appliance is off. Trip arm 43 is extended into the path of travel of "on" trip lug 30. The "on" trip lug is set to engage trip arm 43 at some predetermined time. Hence, the controlled appliance remains off until the "on" trip lug engages trip arm 43 to pivot the actuator to its other position in which switch 4 is closed and the appliance is on. Therefore, the appliance remains off until the preselected time at which the appliance is automatically turned on.

FIG. 5 shows the position of the various elements of the operating mechanism when the time switch is set for "automatic off" operation. In this condition the switch contacts are closed and hence the appliance is on. Since the actuator is in a position to close the contacts, moving the trip arm to its extended position disposes the tip of the trip arm in the path of travel of "off" trip lug 29. The "off" trip lug is set to engage trip arm 43 at a predetermined time. When "off" trip lug 29 engages trip arm 43 the actuator is pivoted and switch contacts 35, 36 open to turn the appliance off.

At the beginning of the "controlled interval on" cycle of operation the operating elements of the time switch are in their FIG. 6 positions. Here it is seen that the switch contacts are open so that the appliance is off and trip arm 43 is in the path of travel of "on" trip lug 30. The "on" trip lug is set to engage trip arm 43 to pivot the actuator and thus turn the appliance on at a preselected time. Trip lug 29 is set to engage trip arm 43 at a certain time after it is engaged by "on" trip lug 30. Hence, the appliance is originally off, is turned on by the operation of the "on" trip lug, remains on for a preselected period of time, and is then turned off by the "off" trip lug.

At the commencement of a "controlled interval off" cycle of operation the operating mechanism of the time switch occupies the position shown in FIG. 5. Here the contacts are closed so that the appliance is on, and the trip arm is extended into the path of travel of "off" trip lug 29. The "off" trip lug is set to engage trip arm 43 at a predetermined time to turn the appliance off. The "on" trip lug is set to engage the trip arm at a predetermined later time to turn the appliance back on. Hence, the appliance that is originally on is turned off, remains off for a preselected period of time and is again turned on at the end of the controlled time interval.

From an examination of FIGS. 5 and 6 it is apparent that when the switch actuator is pivoted to a position in which the contacts are closed the trip arm is in a position in which it can be engaged only by the "off" trip lug and the on trip lug passes beyond the side edge of the arm without engaging the arm. Correspondingly, as seen in FIG. 6 when the actuator is pivoted to a position to open the contacts the "off" trip lug passes beyond the other side edge of trip arm 43 without engaging the arm. However, when the switch actuator is operated by either trip lug the arm is pivoted to a position in which a subsequent automatic operation of the actuator is effected by the other trip lug.

A particularly advantageous feature of this time switch is the arrangement which permits extending or retracting trip arm 43 by rotating knob 63 when the actuator is in either of its positions without operating the switch. Hence, when the trip arm is extended and the contacts are closed as shown in FIG. 5 the trip arm can be retracted merely by rotating knob 63 in a clockwise direction to the position of FIG. 7. To again extend the trip arm it is merely necessary to rotate knob 63 in a counterclockwise direction. Similarly, when the trip arm is in its extended position and the contacts are open as shown in FIG. 6 the trip arm can be retracted merely by rotating the control knob 63 in a clockwise direction without operating the contacts to the position of FIG. 8. The trip arm can also be extended from its FIG. 8 position, again, without operating the contacts.

Hence, applicants have devised a time switch for automatic and manual operation which can be manually set for six different control functions. The manual control member for setting the switch is operated like a toggle switch for off or on operation and is rotated in one direction or the other to set the time switch for automatic operation.

While only one specific embodiment of this invention has been shown and described in detail, it is to be understood that this invention is susceptible to various changes and modifications without departing from the scope of the invention. Hence, although the disclosed embodiment shows the time switch in an upright housing with the dial face vertical and rotatable about a horizontal axis, it is within the contemplated scope of this invention that the time switch can be disposed in various other positions and that the scope of the invention is as defined in the appended claims.

What is claimed is:

1. In a time switch the combination comprising:
 an electrical switch including contacts,
 a switch actuator mounted for pivotal movement about an axis, said actuator being operable to a first position to open said contacts, and a second position to close said contacts,
 a trip arm carried by said actuator for movement therewith, said trip arm also being moveable relative to said actuator to an extended position and to a retracted position,
 driven trip lugs engageable with said trip arm only in its extended position to move said actuator from one position to the other to automatically operate said contacts at preselected times,
 a manually operable control member connected to said actuator to manually move said actuator from one position to the other to manually operate said contacts,
 said control member being manually operable to move said trip arm to its extended and retracted positions while said actuator is in either of its positions, without moving said actuator or operating said switch.

2. A time switch in accordance with claim 1, in which:
 said trip lugs are driven in a circular path of travel about a common axis, and
 the axis of pivotal movement of said switch actuator is disposed in a plane substantially perpendicular to said common axis and spaced from the circular path of travel of said trip lugs.

3. A time switch in accordance with claim 1, in which said manually operable control member is mounted for rotation relative to said actuator,
 manually rotating said control member being effective to move said trip arm to its extended position and to its retracted position, and
 manually oscillating said control member relative to the axis of said switch actuator being effective to manually operate said contacts.

4. A time switch in accordance with claim 1 in which, said trip arm projects radially of this axis of pivotal movement of said switch actuator.

5. A time switch in accordance with claim 1 in which, said trip lugs are adjustable to preset the times of automatic operation of said switch contacts, and
 said trip lugs are driven by a time driven dial.

6. A time switch in accordance with claim 3 in which, said control member is mounted for rotation about an axis perpendicular to the axis of pivotal movement of said switch actuator.

7. A time switch in accordance with claim 6 in which movement of said trip arm to its extended and retracted positions is in a plane perpendicular to the rotational axis of said control member.

8. In a time switch, the combination comprising:
 a housing;
 an electrical switch including contacts supported in said housing;
 a bracket secured in said housing and having a U-shaped portion;
 aligned bearing members on legs of said U-shaped portion of said bracket;
 a switch actuator supported by said bearing members for pivotal movement to a first position to open said contacts, and
 a second position to close said contacts;
 stop means on said bracket to limit the pivotal movement of said actuator to each of said positions;
 a trip arm carried by said actuator for movement therewith, said trip arm also being movable relative to said actuator to an extended position, and to a retracted position;

driven trip lugs engageable with said trip arm only in its extended position to move said actuator from one position to the other to automatically operate said contacts at preselected times; and a manually operable control member connected to said actuator to manually move said actuator from one position to the other to manually operate said contacts;

said control member being also manually operable to move said trip arm to its extended and retracted positions without operating said switch.

9. A time switch in accordance with claim 8, in which:

said control member is a shaft supported by said actuator, said shaft having its axis perpendicular to the axis of pivotal movement of said actuator, and said stop means engage a portion of said shaft to limit the pivotal movement of said actuator.

10. A time switch in accordance with claim 8, in which:

said control member is a shaft supported by said actuator for rotation relative to said actuator, said shaft projecting transversely of this axis of pivotal movement of said actuator, said shaft being connected to said trip arm so that rotation of said shaft in one direction is effective to move said trip arm to its extended position and rotation of said shaft in the opposite direction is effective to move said trip arm to its retracted position, and means for maintaining said trip arm in either of said positions.

No references cited.

BERNARD A. GILHEANY, *Primary Examiner.*